US006734578B2

(12) United States Patent
Konno et al.

(10) Patent No.: US 6,734,578 B2
(45) Date of Patent: May 11, 2004

(54) VEHICULAR REMOTE CONTROL LOCK APPARATUS

(75) Inventors: Takeshi Konno, Saitama (JP); Atsuo Ota, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 184 days.

(21) Appl. No.: 10/131,023

(22) Filed: Apr. 25, 2002

(65) Prior Publication Data

US 2002/0180273 A1 Dec. 5, 2002

(30) Foreign Application Priority Data

May 29, 2001 (JP) ........................ 2001-160048
Jun. 6, 2001 (JP) ........................ 2001-171244

(51) Int. Cl.[7] ..................... B60R 25/00; G06K 19/00
(52) U.S. Cl. ..................... 307/10.2; 340/5.2; 70/237
(58) Field of Search ............... 307/10.1–10.4; 70/237; 340/5.1–5.91

(56) References Cited

U.S. PATENT DOCUMENTS

| 4,857,917 | A | | 8/1989 | Sato |
| 5,481,253 | A | * | 1/1996 | Phelan et al. ............. 340/5.67 |
| 5,708,417 | A | * | 1/1998 | Tallman et al. .......... 340/539.23 |
| 6,121,692 | A | * | 9/2000 | Michaels et al. ........... 307/10.1 |
| 6,181,254 | B1 | * | 1/2001 | Vogele ................... 340/825.69 |
| 6,437,460 | B1 | * | 8/2002 | Theofanopoulos et al. 307/10.1 |
| 6,525,433 | B1 | * | 2/2003 | Enoyoshi et al. .......... 307/10.5 |
| 6,625,553 | B1 | * | 9/2003 | Modgil ...................... 702/63 |
| RE38,338 | E | * | 12/2003 | Yoshida et al. ............ 307/10.2 |

FOREIGN PATENT DOCUMENTS

| DE | 199 01 364 A | 7/1999 |
| DE | 199 01 364 A1 | 7/1999 |
| DE | 198 32 203 A1 | 1/2000 |
| DE | 198 32 203 A | 1/2000 |
| EP | 1 067 028 A2 | 1/2001 |
| JP | 10-336760 A | 12/1998 |
| JP | 10 336730 A | 3/1999 |

* cited by examiner

Primary Examiner—Gregory J. Toatley, Jr.
(74) Attorney, Agent, or Firm—Birch, Stewart, Kolasch & Birch, LLP (57) ABSTRACT

To prevent exhaustion of a battery by minimizing standby current while maintaining maximum response of a remote control lock apparatus. A lock control means for controlling an actuator for actuating and de-actuating a steering lock device of a vehicle by means of a remote control transmitter is provided, and power is saved by intermittently supplying a standby current to the lock control means while the steering lock device is actuated. In a normal mode for a short standby time shown in the figure, the standby current is supplied to an ID code obtaining means at a high intermittent supply ratio to thereby save power while maintaining quick response in de-actuating the steering lock device. In a long leaving mode for a long standby time, the standby current is supplied to both the ID code obtaining means and an ID code verifying means at a low intermittent supply ratio to thereby further save power while slightly sacrificing response in de-actuating the steering lock device.

9 Claims, 9 Drawing Sheets

TIME CHART OF NORMAL MODE (AT LOCK RELEASE)

FIRST CONVENTIONAL EXAMPLE

VEHICULAR REMOTE CONTROL LOCK APPARATUS

CROSS-REFERENCE TO RELATED APPLICATIONS

This non-provisional application claims priority under 35 U.S.C. §119(a) on Patent Application Nos. 2001-160048 and 2001-171244 filed in Japan on May 29, 2001 and Jun. 6, 2001, respectively, the entirety of which are hereby incorporated by reference.

BACKGROUND OF THE INVENTION

1. Field of the Invention

The present invention relates to a vehicular remote control lock apparatus that has a lock control means for controlling an actuator for actuating and de-actuating a steering lock device of a vehicle by means of a remote control transmitter. The vehicular remote control lock apparatus saves power by intermittently supplying standby current to the lock control means while the steering lock device is actuated. In the present invention, the remote control transmitter may be capable of transmitting a starting code and an ID code by operation of a control button thereof.

2. Description of Background Art

A remote control lock apparatus for actuating and de-actuating a door lock device by operating a remote control transmitter external to a vehicle is well known in a four-wheel vehicle. In such a remote control lock apparatus, a lock control means receives an ID code transmitted from the remote control transmitter, and then compares the ID code with an ID code prestored therein. When the ID codes coincide with each other, the door lock device is de-actuated, thus preventing theft or unpermitted use of the vehicle. For this purpose, it is necessary to supply a standby current to the lock control means at all times while the occupants of the vehicle are away from the vehicle. Since supplying the standby current to the lock control means for a long time period increases a load on the battery; however, power is saved by intermittently supplying the standby current to the lock control means. For example, by intermittently driving an ID code obtaining means of the lock control means, it is possible to reduce the standby current to about 1.5 mA. By intermittently driving both the ID code obtaining means and an ID code verifying means of the lock control means, it is possible to reduce the standby current to about 1.0 mA.

In addition, a remote control lock apparatus for actuating and de-actuating a steering lock device by operating a remote control transmitter external to a vehicle is known in a motorcycle. In such a remote control lock apparatus, a lock control means receives an ID code transmitted from the remote control transmitter, and then compares the ID code with an ID code prestored therein. When the ID codes coincide with each other, the steering lock device is de-actuated, thus preventing theft or unpermitted use of the vehicle. For this purpose, it is necessary to supply a standby current to the lock control means at all times while the occupant of the vehicle is away from the vehicle. Since supplying the standby current to the lock control means for a long time period increases a load on the battery; however, power is saved by intermittently supplying the standby current to the lock control means.

Figure 8:
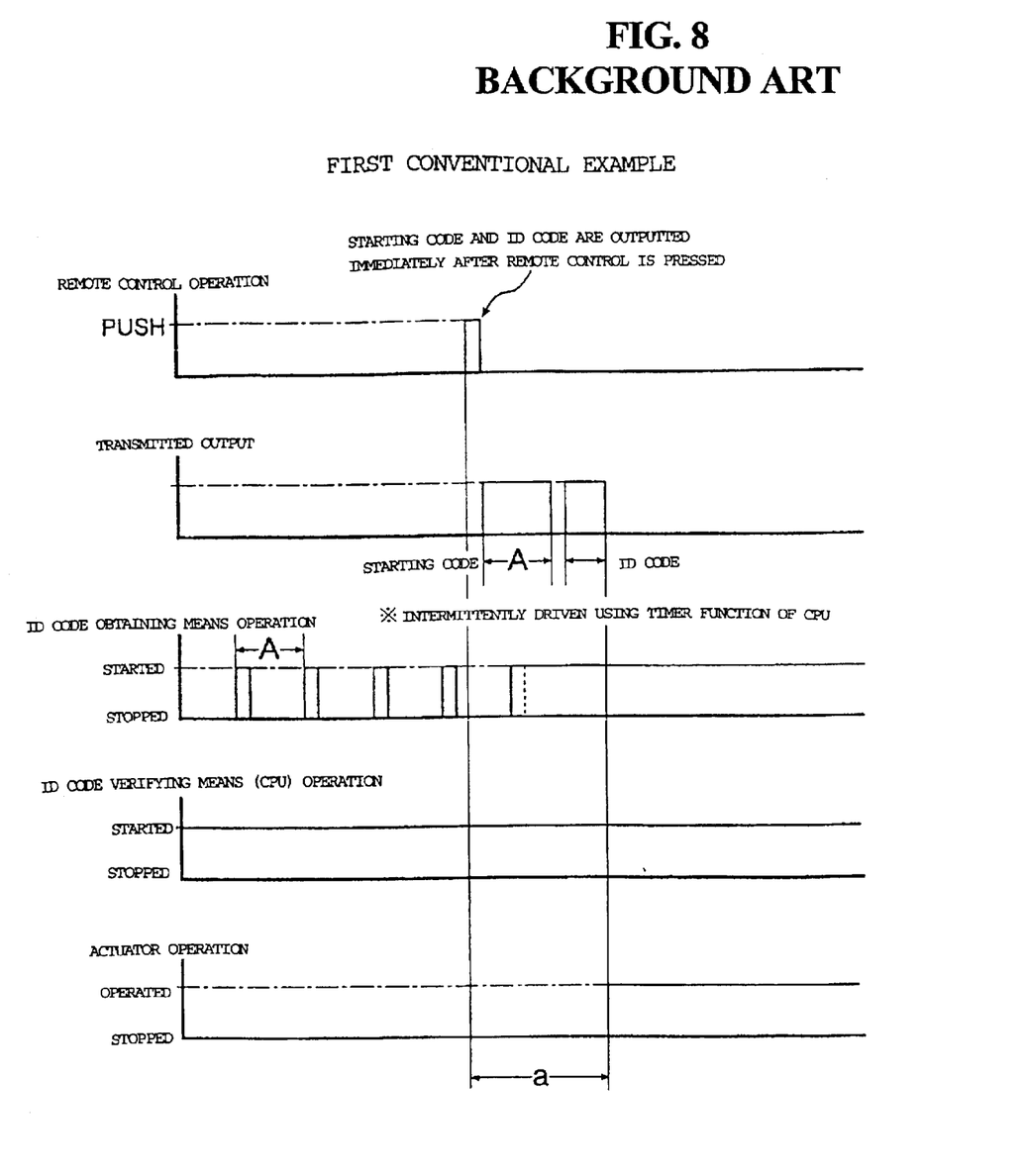
FIG. 8 is a time chart explaining a first conventional example.

In a first conventional example shown in FIG. 8, a lock control means of a remote control lock apparatus includes an ID code obtaining means and an ID code verifying means. In order to save power, the ID code obtaining means is supplied with an intermittent standby current. A starting code signal is transmitted after a control button of a remote control transmitter is pressed and then released. An output time A of the starting code signal coincides with a cycle A in which the intermittent current is supplied to the ID code obtaining means. Therefore, a state in which the ID code obtaining means is supplied with current always occurs during the period when the starting code signal is transmitted. Accordingly, the starting code signal is received reliably during the period. When the starting code signal is thus received, the ID code obtaining means, which has been supplied with the intermittent current, is then supplied with a continuous current. Therefore, an ID code signal transmitted by the remote control transmitter following the starting code signal is received reliably by the ID code obtaining means. The ID code verifying means compares the ID code obtained by the ID code obtaining means with a prestored ID code. When the ID codes coincide with each other, an actuator is activated to de-actuate a steering lock device.

The first conventional example shown in FIG. 8 transmits the starting code signal and the ID code signal when the control button of the remote control transmitter is pressed and released in a mere instant. In a second conventional example shown in FIG. 9 the starting code signal and the ID code signal are transmitted after the control button of the remote control transmitter continues being pressed for a certain time (for example 0.5 sec to 1.0 sec) and then released. Otherwise, the second conventional example functions in the same manner as the first conventional example.

SUMMARY OF THE INVENTION

When the remote control lock apparatus of the four-wheel vehicle is applied to a steering lock device of a small vehicle such as a motorcycle or a motor tricycle, problems arise since the battery of the small vehicle has a small capacity. Accordingly, the battery can be exhausted even if power is saved by the method of intermittently supplying standby current. In order to prevent this, decreasing an intermittent supply ratio (ratio of a time for which the standby current is supplied to a total time) of the standby current is conceivable. However, this lengthens the time intervals at which the standby current is supplied, thus resulting in a longer response time between the operation of the remote control transmitter and the actuation of the steering lock device. As another method, it is conceivable that the supply of the standby current to the lock control means is interrupted when the vehicle is left unused for a certain time. However, this naturally makes it impossible to actuate the steering lock device by means of the remote control transmitter when the vehicle is used the next time, and also requires an operation for restarting the lock control means by using a starting switch or the like.

The present invention has been made in view of the above, and it is accordingly an object of the present invention to prevent exhaustion of the battery by minimizing the standby current while maintaining maximum response of the remote control lock apparatus.

The first conventional example transmits the starting code signal and the ID code signal when the control button of the remote control transmitter is pressed and released in a mere instant. Accordingly, if the remote control transmitter is carried in a pocket or a handbag, the steering lock device may be de-actuated unintentionally if the control button is pressed by mistake. In the second conventional example the remote control transmitter does not transmit the starting code signal and the ID code signal unless the control button of the remote control transmitter is pressed continuously for a certain time. Accordingly, although there is no fear of the unintentional de-actuation mentioned above, a response time b between the pressing of the control button and the de-actuation of the steering lock device is longer than a response time a of the first conventional example, thus resulting in degradation in response.

The present invention has been made in view of the above, and it is accordingly an object of the present invention to ensure maximum response in de-actuating the steering lock device while preventing erroneous activation.

In order to achieve the above objects, according to a first aspect of the present invention, a vehicular remote control lock apparatus includes a lock control means for controlling an actuator for actuating and de-actuating a steering lock device of a vehicle by means of a remote control transmitter. Power is saved by intermittently supplying a standby current to the lock control means while the steering lock device is actuated. A plurality of modes having different intermittent supply ratios of the standby current are selectable. A mode for shorter standby time of the lock control means has a higher intermittent supply ratio while a mode for longer standby time of the lock control means has a lower intermittent supply ratio.

With the configuration described above, when power is saved by intermittently supplying the standby current to the lock control means while the steering lock device is actuated, it is possible to enhance the response in de-actuating the steering lock device by increasing the intermittent supply ratio in the mode for short standby time. This does not particularly necessitate a saving of power. However, it is possible to effectively save power by decreasing the intermittent supply ratio in the mode for long standby time, which particularly necessitates a saving of power. It is thereby possible to reconcile the response in de-actuating the steering lock device with the saving of power. In addition, since the supply of the current to the lock control means is not completely interrupted even in a long standby time, a special operation for restarting the lock control means is not required.

Furthermore, according to a second aspect of the present invention, in addition to the configuration of the first aspect of the present invention, a vehicular remote control lock apparatus is provided, wherein the lock control means includes: an ID code obtaining means for receiving an ID code transmitted from the remote control transmitter; and an ID code verifying means for comparing the obtained ID code with a prestored ID code. In addition, in a normal mode for short standby time of the lock control means, the ID code obtaining means is driven intermittently and the ID code verifying means is driven continuously. However, in a long leaving mode for long standby time of the lock control means, both the ID code obtaining means and the ID code verifying means are driven intermittently.

With the configuration described above, only the ID code obtaining means is driven intermittently in the normal mode for short standby time of the lock control means. However, both the ID code obtaining means and the ID code verifying means are driven intermittently in the long leaving mode for long standby time of the lock control means. It is therefore possible to save power more effectively in the long leaving mode for long standby time, which particularly necessitates a saving of power.

Furthermore, according to a third aspect of the present invention, a vehicular remote control lock apparatus includes a lock control means for controlling an actuator for actuating and de-actuating a steering lock device of a vehicle by means of a remote control transmitter capable of transmitting a starting code and an ID code by operation of a control button thereof. Power is saved by intermittently supplying a standby current to the lock control means while the steering lock device is actuated. The remote control transmitter transmits the starting code immediately after the control button is pressed, and when the control button remains pressed after the transmission of the starting code is completed, the remote control transmitter transmits the ID code.

With the configuration described above, the starting code is transmitted immediately after the control button of the remote control transmitter is pressed. When the control button remains pressed after the transmission of the starting code is completed and the lock control means is started, the ID code is transmitted. The actuator is then activated to thereby de-actuate the steering lock device of the vehicle. Therefore, since the ID code is not transmitted when the control button is pressed only momentarily, there is no fear of erroneously activating the actuator. In addition, since the starting code is transmitted immediately after the pressing of the control button, the response time between the pressing of the control button and the activation of the actuator can be reduced as compared with a conventional example that transmits the starting code after the control button is pressed and then released.

It is to be noted that a lock/unlock button 14a in the following examples corresponds to the control button in the present invention. Also, the foregoing word "immediately" considered to include passage of an infinitesimal time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the present invention will hereinafter be described with reference to examples of the present invention shown in the accompanying drawings.

Figure 1:
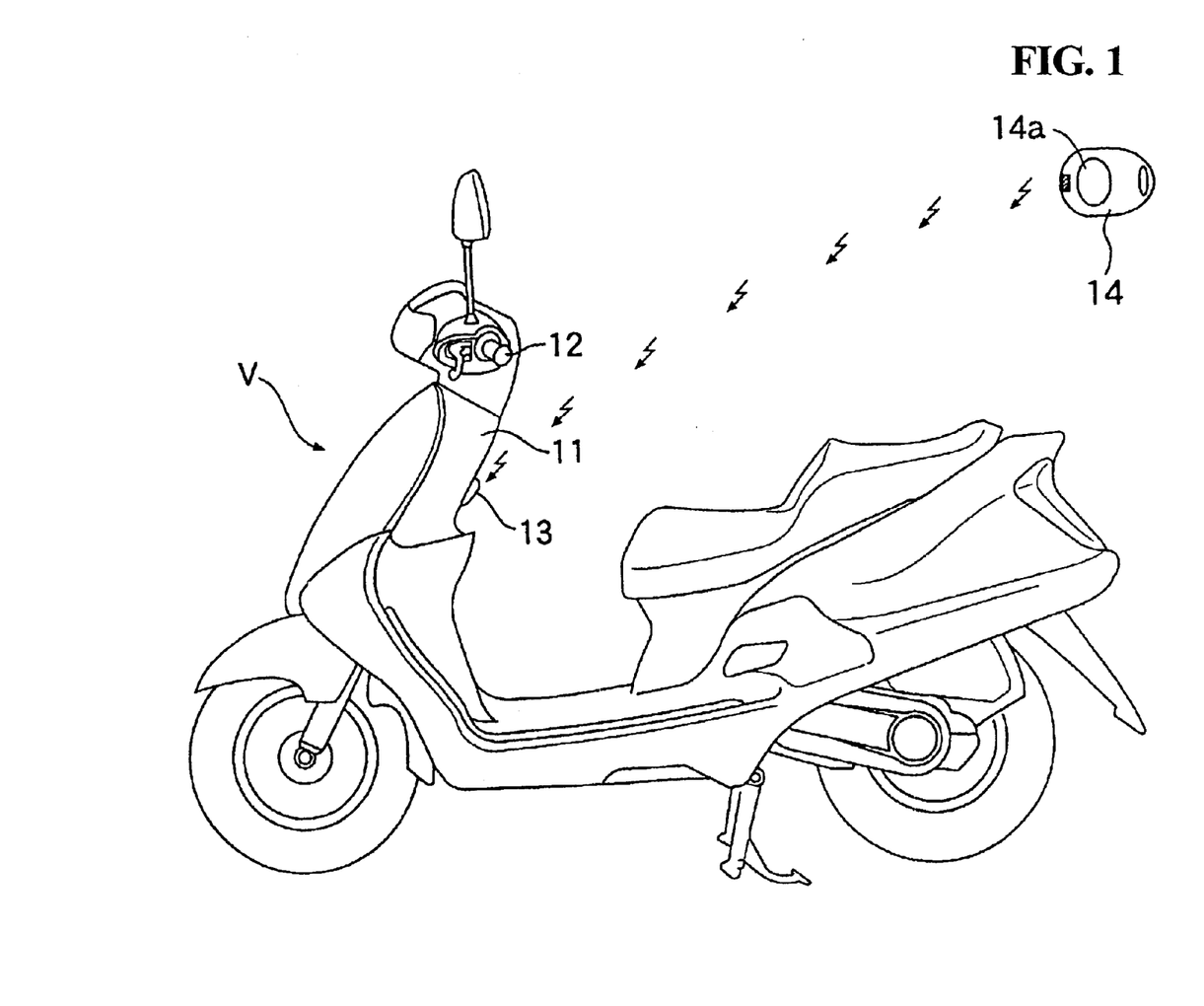
FIG. 1 is a general side view of a motorcycle with a remote control lock apparatus.
Figure 2:
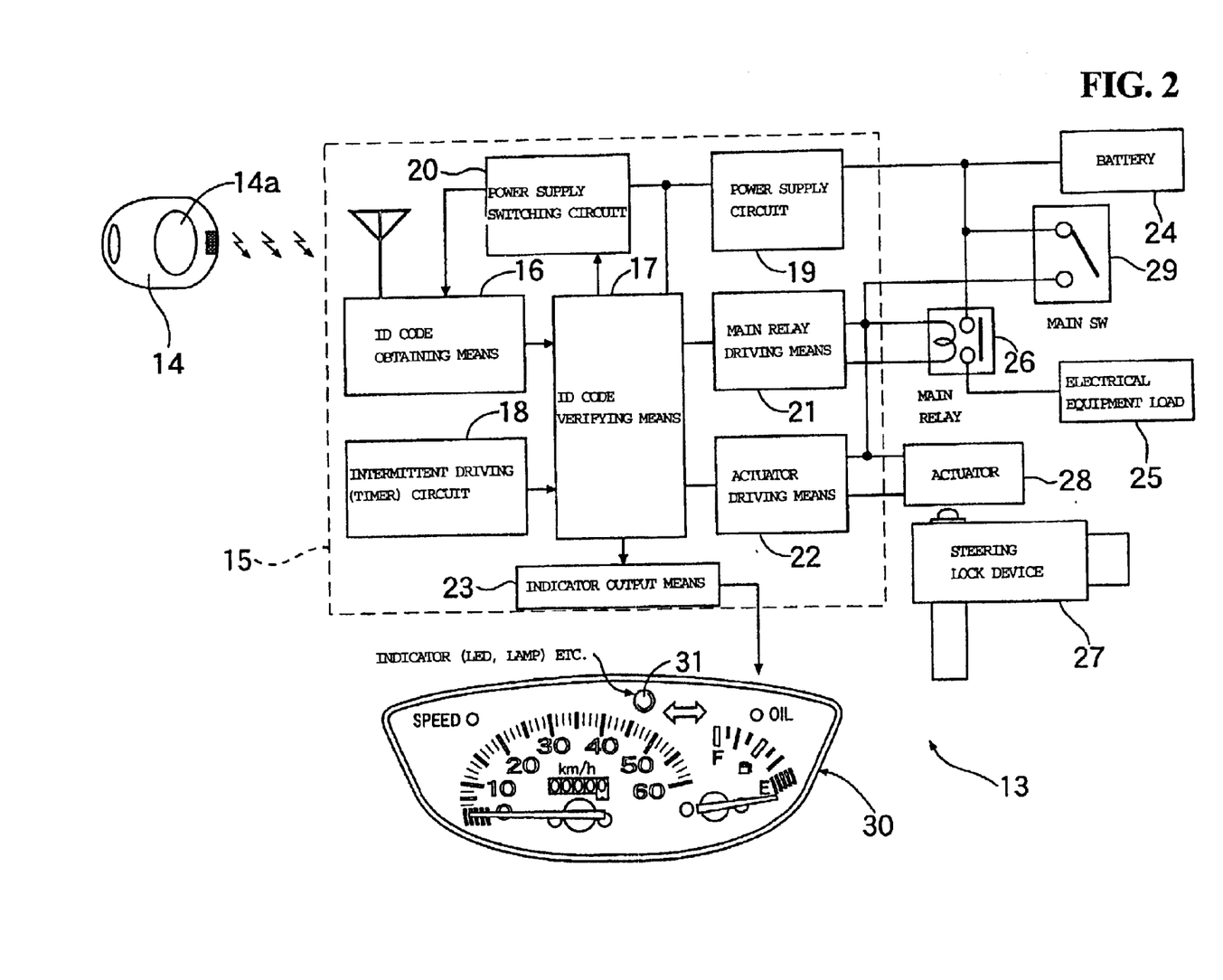
FIG. 2 is a block diagram of the remote control lock apparatus.
Figure 3:
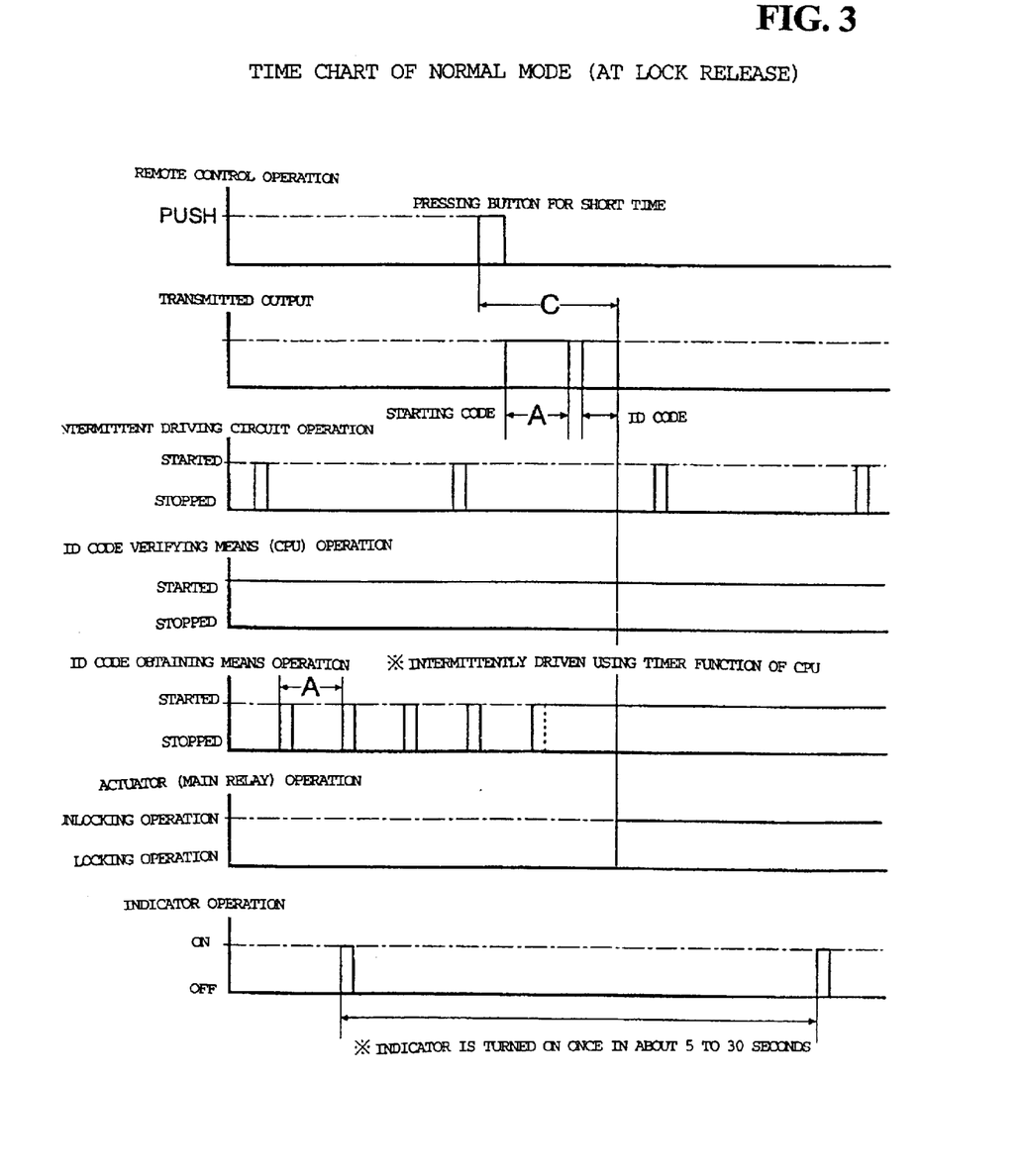
FIG. 3 is a time chart explaining the operation of a normal mode.
Figure 4:
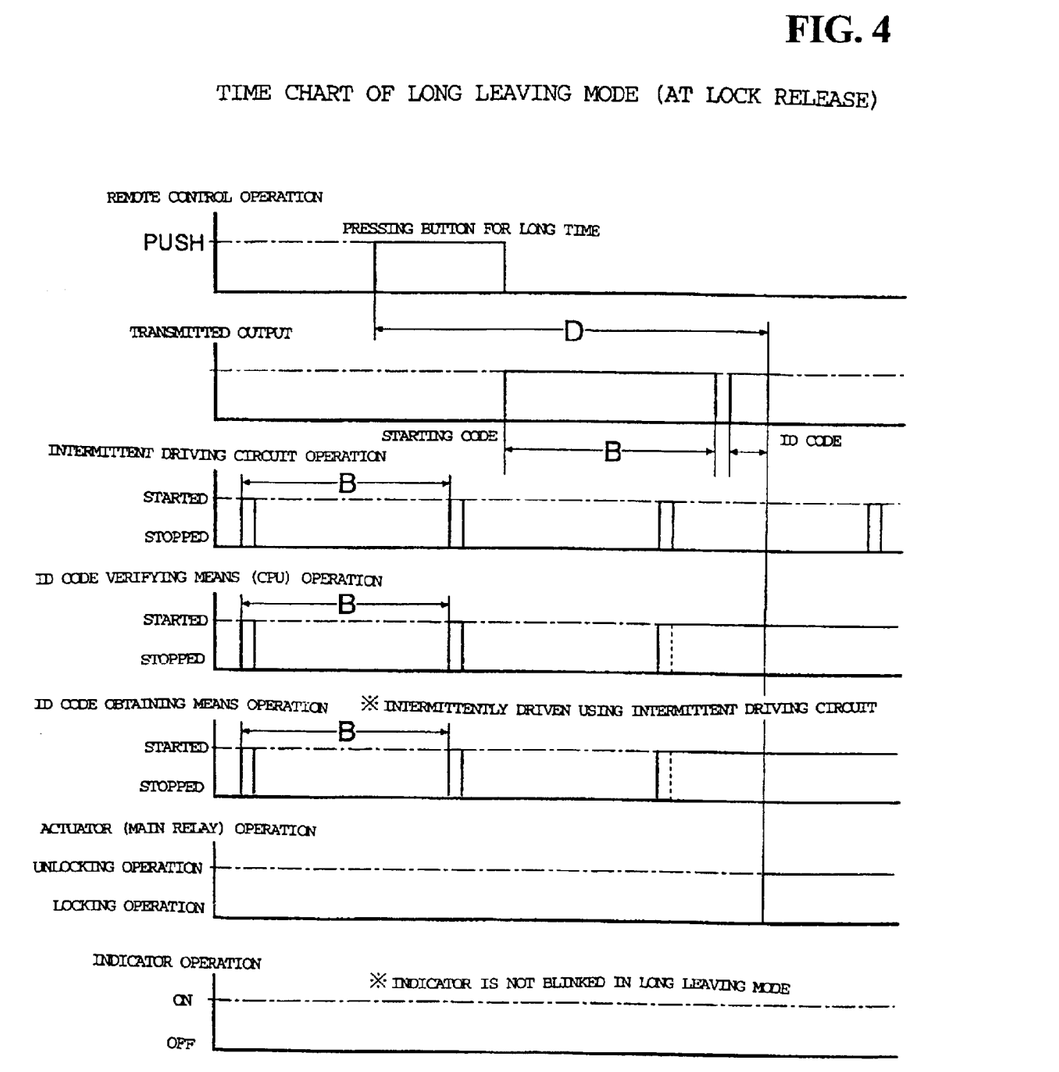
FIG. 4 is a time chart explaining the operation of a long leaving mode.

FIGS. 1 to 4 show a first example of the present invention. FIG. 1 is a general side view of a motorcycle with a remote control lock apparatus. FIG. 2 is a block diagram of the remote control lock apparatus. FIG. 3 is a time chart explaining operation of a normal mode. FIG. 4 is a time chart explaining operation of a long leaving mode.

As shown in FIG. 1, a remote control lock apparatus 13 for locking or unlocking rotational movement of a steering handlebar 12 is provided in an upper portion of a leg shield 11 of a scooter type motorcycle V. The remote control lock apparatus 13 is actuated by a radio wave transmitted from a remote control transmitter 14 held in the hand of an occupant of the motorcycle and operated by the occupant.

As shown in FIG. 2, the remote control lock apparatus 13 includes a lock control means 15. The lock control means 15 includes an ID code obtaining means 16, an ID code verifying means 17, an intermittent driving circuit 18, a power supply circuit 19, a power supply switching circuit 20, a main relay driving means 21, an actuator driving means 22, and an indicator output means 23.

The main relay driving means 21 is connected to a main relay 26 for connecting a vehicle-mounted battery 24 to various electrical equipment loads 25. The actuator driving means 22 is connected to an actuator 28 of a steering lock device 27 for locking the steering handlebar 12 of the motorcycle V so as to disable the steering handlebar 12 from rotational movement. When a main switch 29 is opened and closed manually, the main relay 26 and the steering lock device 27 can be operated without using the lock control means 15. The indicator output means 23 controls the switching on and off of an indicator 31 provided on a meter panel 30.

The lock control means 15 can be switched between the normal mode and the long leaving mode for different amounts of consumption of standby current. When the occupant turns off the main switch 29 to leave the vehicle, the lock control means 15 is put into the normal mode. When the normal mode continues for a preset time, the normal mode is switched to the long leaving mode.

As is clear by reference to FIG. 3 and FIG. 4, the ID code obtaining means 16 and the ID code verifying means 17 are supplied with current from the vehicle-mounted battery 24 via the power supply circuit 19 and the power supply switching circuit 20. In this case, a timer provided within the ID code verifying means 17 or a timer in the intermittent driving circuit 18 outputs a pulse signal at an interval of a predetermined time. The supply of the standby current to the ID code obtaining means 16 and the ID code verifying means 17 is controlled on the basis of the pulse signals.

In the normal mode shown in FIG. 3, the ID code verifying means 17 is supplied with a continuous current, while the ID code obtaining means 16 is supplied with an intermittent current based on the pulse signals from the timer provided within the ID code verifying means 17. An intermittent supply ratio (ratio of time for which the current is supplied to a total time) in this case is relatively high at about 3.3% to 20%, and thus the standby current of the lock control means 15 is about 1.5 mA to 3.0 mA. In this normal mode, the indicator 31 provided on the meter panel 30 blinks.

In the long leaving mode shown in FIG. 4, both the ID code verifying means 17 and the ID code obtaining means 16 are supplied with an intermittent current based on the pulse signals outputted by the timer in the intermittent driving circuit 18. The intermittent supply ratio (ratio of time for which the current is supplied to a total time) in this case is relatively low at about 0.5%, and thus the standby current of the lock control means 15 is 100 $\mu$A to 500 $\mu$A. In this long leaving mode, the indicator 31 provided on the meter panel 30 is turned off.

When a lock/unlock button 14a of the remote control transmitter 14 is pressed and released, a starting code signal and an ID code signal are transmitted. When the lock/unlock button 14a is pressed for a short time (for example less than 0.5 sec), the starting code signal of short duration (for example 50 to 300 msec) is transmitted (see FIG. 3). When the lock/unlock button 14a is pressed for a long time (for example 0.5 sec or more), the starting code signal of long duration (for example 300 to 1000 msec) is transmitted (see FIG. 4).

Operation of the example of the present invention provided with the above configuration will next be described.

When the steering lock device 27 is de-actuated to move the stationary vehicle, a state of the indicator 31 provided on the meter panel 30 is first checked. When the indicator 31 is blinking, it is determined that the lock control means 15 is in the normal mode. Accordingly, the lock/unlock button 14a of the remote control transmitter 14 is pressed for a short time (less than 0.5 sec), as shown in FIG. 3. At an instant when the lock/unlock button 14a is released, the remote control transmitter 14 outputs a starting code signal and an ID code signal. An output time A of the starting code signal in the normal mode is relatively short at 50 to 300 msec. The output time A of the starting code signal coincides with a cycle A in which the intermittent current is supplied to the ID code obtaining means 16. Therefore, a state in which the ID code obtaining means 16 is supplied with the current always occurs during the period when the starting code signal is outputted. Accordingly, the starting code signal is received reliably during the period.

When the starting code signal is received, the ID code obtaining means 16, which has been supplied with the intermittent current, is then supplied with a continuous current. Therefore, the ID code signal transmitted by the remote control transmitter 14 following the starting code signal is received reliably by the ID code obtaining means 16. The ID code verifying means 17 compares the ID code thus obtained by the ID code obtaining means 16 with a prestored ID code. When the ID codes coincide with each other, the actuator driving means 22 is actuated to de-actuate the steering lock device 27, and the main relay driving means 21 closes the main relay 26 to supply power from the battery 24 to the electrical equipment load 25. In this normal mode, a time between the pressing of the lock/unlock button 14a and the de-actuation of the steering lock device 27 is a relatively short C.

When the indicator 31 provided on the meter panel 30 is off, on the other hand, it is determined that the lock control means 15 is in the long leaving mode. Accordingly, the lock/unlock button 14a of the remote control transmitter 14 is pressed for a long time (0.5 sec or more), as shown in FIG. 4. At an instant when the lock/unlock button 14a is released, the remote control transmitter 14 outputs a starting code signal and an ID code signal. An output time B of the starting code signal in the long leaving mode is relatively long at 300 to 1000 msec. The output time B of the starting code signal coincides with a cycle of the pulse signal outputted by the timer in the intermittent driving circuit 18, that is, a cycle B in which the intermittent current is supplied to the ID code obtaining means 16 and the ID code verifying means 17. Therefore, a state in which the ID code obtaining means 16 is supplied with the current always occurs during the period when the starting code signal is outputted, and thus the starting code signal is received reliably during the period.

When the starting code signal is received, the ID code obtaining means 16 and the ID code verifying means 17, which have been supplied with the intermittent current, are then supplied with a continuous current. Therefore, the ID code signal transmitted by the remote control transmitter 14 following the starting code signal is received reliably by the ID code obtaining means 16. The ID code verifying means 17 verifies the ID code. When the obtained ID code coincides with a prestored ID code, the actuator driving means 22 is actuated to de-actuate the steering lock device 27, and the main relay driving means 21 closes the main relay 26 to supply power from the battery 24 to the electrical equipment load 25. In this long leaving mode, a time between the pressing of the lock/unlock button 14a and the de-actuation of the steering lock device 27 is a relatively long D.

When the starting code is received as described above, the ID code obtaining means 16 and the ID code verifying means 17 are driven continuously (in the normal mode, the ID code verifying means 17 is continuously driven). Therefore, when the occupant leaves the vehicle next time, the steering lock device 27 can be actuated without a problem by pressing the lock/unlock button 14a of the remote control transmitter 14. Incidentally, when the steering lock device 27 is in a de-actuated state, the vehicle is traveling and thereby the battery 24 is being charged; hence, the continuous driving of the ID code obtaining means 16 and the ID code verifying means 17 presents no problem.

As described above, immediately after the steering lock device 27 is actuated, the normal mode is selected, and the standby current is supplied to the ID code obtaining means 16 at a relatively high intermittent supply ratio (that is, at relatively short time intervals). Therefore, it is possible to de-actuate the steering lock device 27 in the relatively short time C (see FIG. 3) to ensure quick response while producing a certain degree of power-saving effect. When a predetermined time has passed since the actuation of the steering lock device 27, on the other hand, the long leaving mode is selected, and the standby current is supplied to both the ID code obtaining means 16 and the ID code verifying means 17 at a relatively low intermittent supply ratio (that is, at relatively long time intervals). Therefore, it is possible to produce great power-saving effect. In this case, however, the relatively long time D (see FIG. 4) is required to de-actuate the steering lock device 27, resulting in a slightly slower response.

Figure 5:
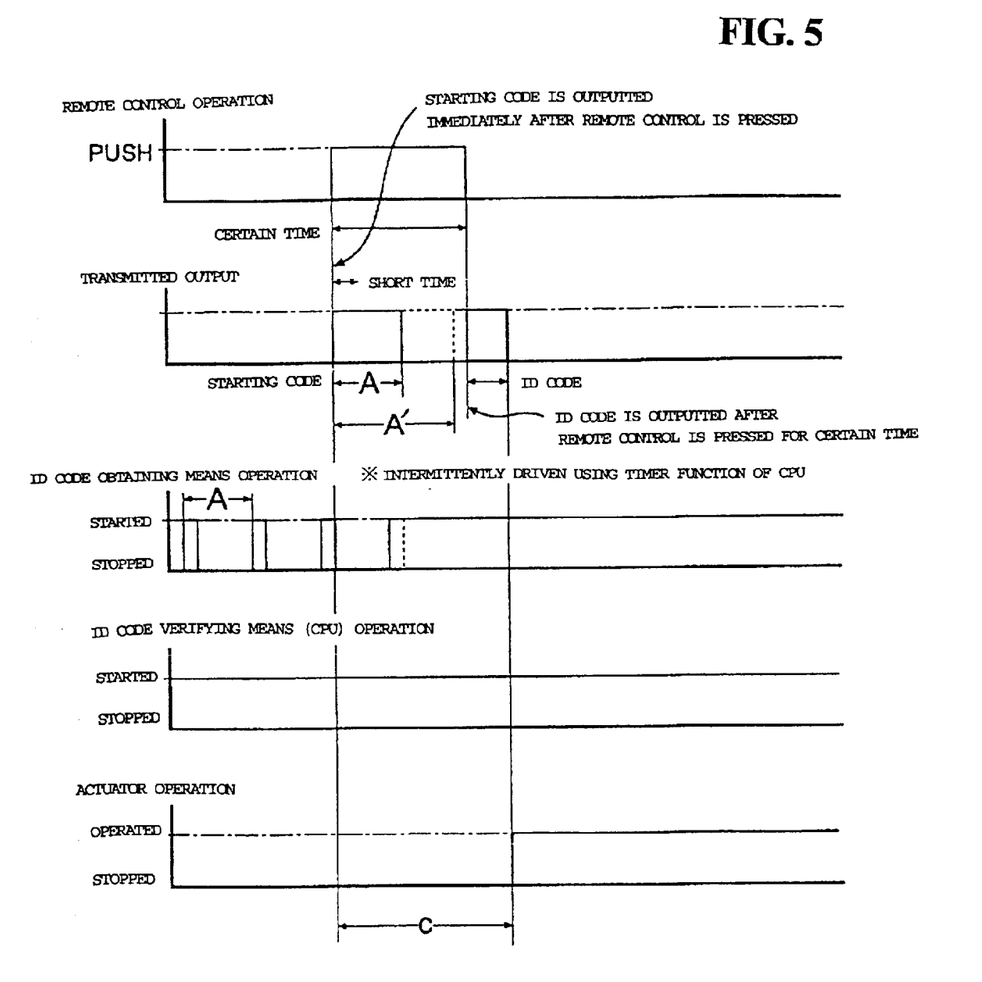
FIG. 5 is a time chart explaining the operation of a second example.

As is clear also by reference to FIG. 5, the ID code obtaining means 16 and the ID code verifying means 17 are supplied with current from the vehicle-mounted battery 24 via the power supply circuit 19 and the power supply switching circuit 20. In this case, a timer provided within the ID code verifying means 17 outputs a pulse signal at an interval of a predetermined time. The supply of the standby current to the ID code obtaining means 16 is controlled on the basis of the pulse signals. Thus, the ID code verifying means 17 is supplied with a continuous current, while the ID code obtaining means 16 is supplied with an intermittent current based on the pulse signals from the timer provided within the ID code verifying means 17. In this case, the indicator 31 provided on the meter panel 30 blinks.

Operation of the example of the present invention provided with the above configuration will next be described.

When the steering lock device 27 is de-actuated to move the stationary vehicle, a state of the indicator 31 provided on the meter panel 30 is first checked. When the indicator 31 is blinking, it is determined that the lock control means 15 is operating. Accordingly, a lock/unlock button 14a of the remote control transmitter 14 is long pressed for a certain short time (0.5 sec to 1.0 sec), as shown in FIG. 3. At an instant when the lock/unlock button 14a is pressed, the remote control transmitter 14 transmits a starting code signal for a time A. The output time A of the starting code signal coincides with a cycle A in which the intermittent current is supplied to the ID code obtaining means 16. Therefore, a state in which the ID code obtaining means 16 is supplied with the current always occurs during the period when the starting code signal is transmitted, and thus the starting code signal is received reliably during the period.

When the starting code signal is received, the ID code obtaining means 16, which has been supplied with the intermittent current, is then supplied with a continuous current. Therefore, an ID code signal transmitted at an instant of releasing the lock/unlock button 14a is received reliably by the ID code obtaining means 16. The ID code verifying means 17 compares the ID code thus obtained by the ID code obtaining means 16 with a prestored ID code. When the ID codes coincide with each other, the actuator driving means 22 is actuated to de-actuate the steering lock device 27, and the main relay driving means 21 closes the main relay 26 to supply power from the battery 24 to the electrical equipment load 25.

As is clear from comparison between FIG. 5 (second example) and FIG. 8 (second conventional example), the second conventional example transmits the starting code signal after the lock/unlock button 14a is long pressed and then released, whereas the second example transmits the starting code signal at an instant when the lock/unlock button 14a is pressed. Thus, even when the lock/unlock button 14a is long pressed for the same time period, response time is reduced from b of the second conventional example (see FIG. 9) to c. Specifically, the second conventional example de-actuates the steering lock device 27 0.3 sec after the lock/unlock button 14a is released, whereas the first example de-actuates the steering lock device 27 0.1 sec after the lock/unlock button 14a is released.

Because the lock/unlock button 14a is long pressed, there is of course no fear of erroneously actuating the steering lock device 27 when the remote control transmitter 14 is put in a pocket or a handbag.

Figure 9:
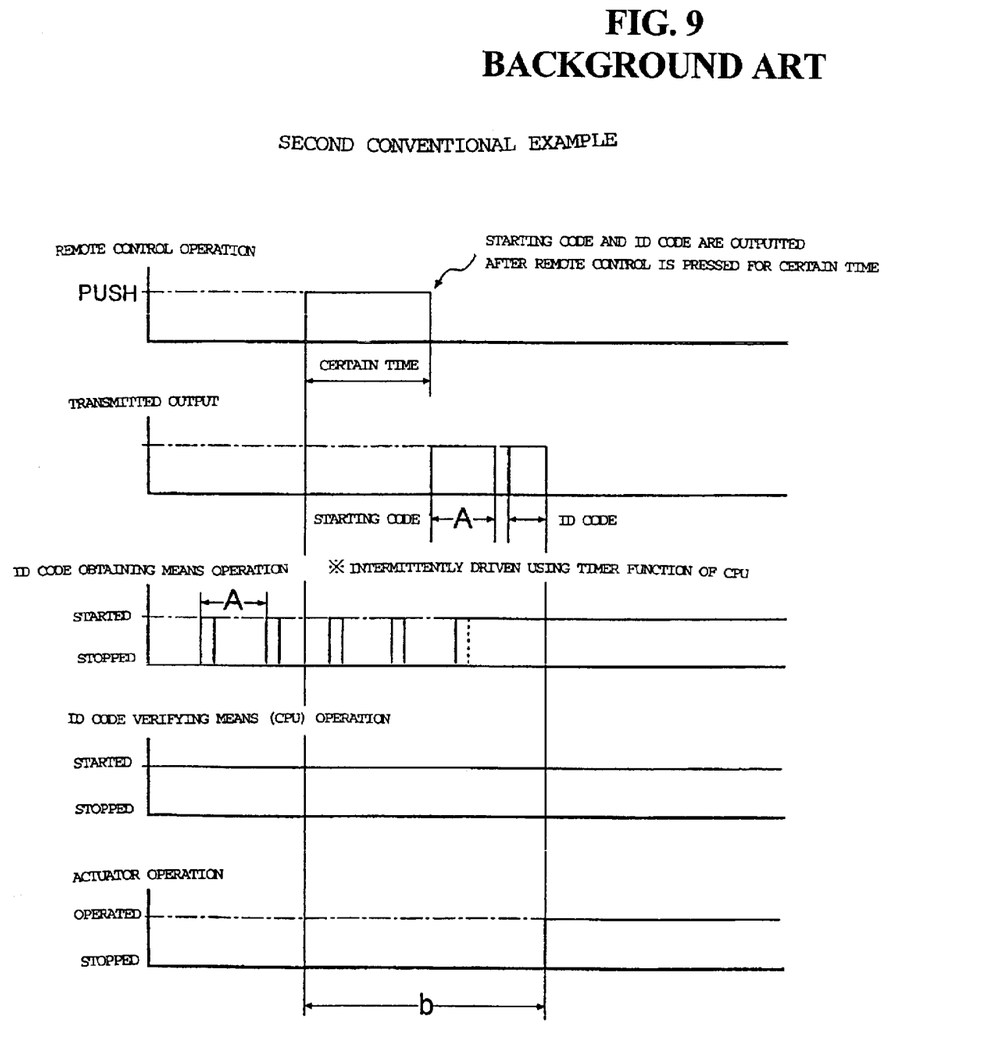
FIG. 9 is a time chart explaining a second conventional example.

In addition, when the time for which the lock/unlock button 14a is long pressed is set to be the same as that of the second conventional example of FIG. 9, the time for which the starting code signal is transmitted can be extended from A to A'. Therefore, the cycle of the intermittent current supplied to the ID code obtaining means 16 can be extended from A to A' to further reduce power consumption. Specifically, an intermittent driving ratio (ratio of a time for which the standby current is supplied to a total time) of the standby current supplied to the ID code obtaining means 16 is reduced to about 1% to 2%, and the standby current is reduced to 100.A to 500.A.

When the starting code is received, the ID code obtaining means 16 is driven continuously. Therefore, when the occupant leaves the vehicle next time, the steering lock device 27 can be actuated without a problem by pressing the lock/unlock button 14a of the remote control transmitter 14. Also, when the steering lock device 27 is in a de-actuated state, the vehicle is traveling and thereby the battery 24 is being charged; hence, the continuous driving of the ID code obtaining means 16 presents no problem.

Figure 6:
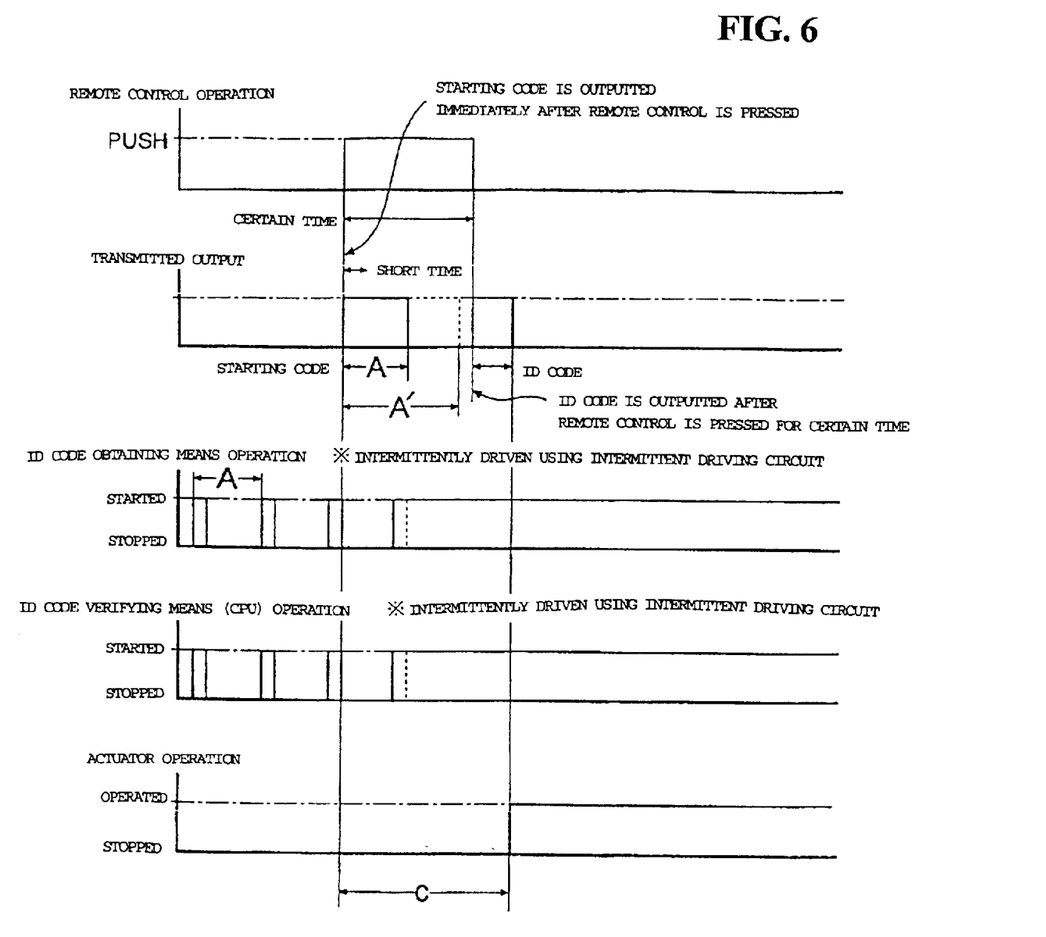
FIG. 6 is a time chart explaining the operation of a third example.

A third example of the present invention will next be described with reference to FIG. 6.

The third example includes an intermittent driving circuit 18. Both an ID code verifying means 17 and an ID code obtaining means 16 are supplied with an intermittent current based on pulse signals outputted by a timer in the intermittent driving circuit 18. Since both the ID code verifying means 17 and the ID code obtaining means 16 are thus supplied with the intermittent current, it is possible to produce greater power-saving effect.

While the examples of the present invention have been described above in detail, the present invention is susceptible of various changes in design without departing from the spirit of the invention.

Figure 7:
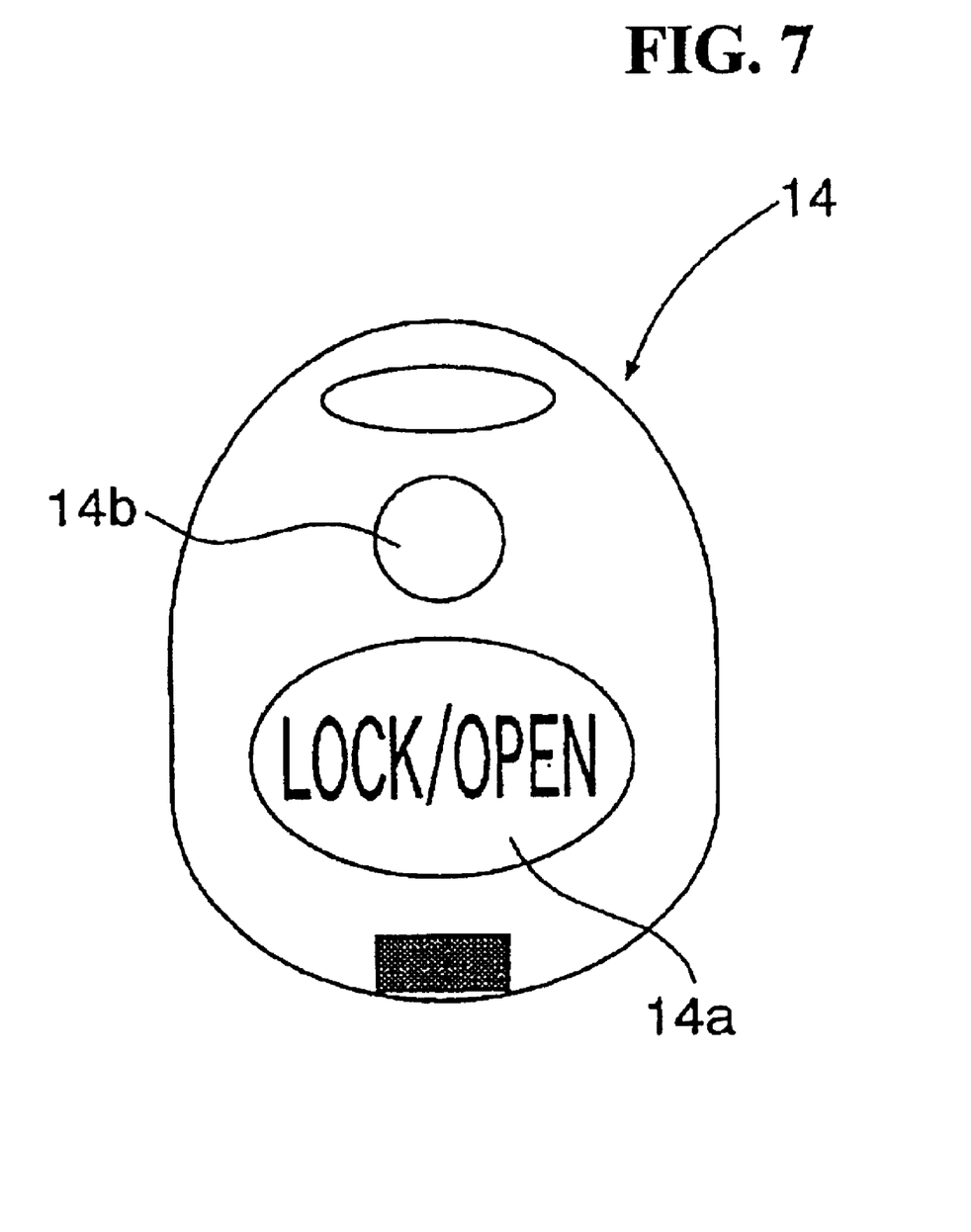
FIG. 7 is a front view of a remote control transmitter according to a fourth example of the present invention.

For example, when as in a fourth example shown in FIG. 7, an unlock button 14b for the long leaving mode is provided to the remote control transmitter 14 so that a starting code signal and an ID code signal can be outputted by momentarily pressing the unlock button 14b, it is not necessary to press the lock/unlock button 14a for a long period, and thereby operability is improved.

Furthermore, while the two modes, that is, the normal mode and the long leaving mode are set in the example, it is possible to set three modes or more.

In addition, while the examples transmit the starting code signal at the instant when the lock/unlock button 14a is pressed, the starting code signal may be transmitted an infinitesimal time after the lock/unlock button 14a is pressed. The infinitesimal time is sufficiently shorter than the time for which the lock/unlock button 14a is pressed.

As described above, according to the first aspect of the present invention, when power is saved by intermittently supplying standby current to the lock control means while the steering lock device is actuated, it is possible to enhance response in de-actuating the steering lock device by increasing the intermittent supply ratio in the mode for short standby time. This does not particularly necessitate a saving of power. However, it is possible to effectively save power by decreasing the intermittent supply ratio in the mode for long standby time, which particularly necessitates a saving of power. It is thereby possible to reconcile the response in de-actuating the steering lock device with the saving of power. In addition, since the supply of current to the lock control means is not completely interrupted even in a long standby time, a special operation for restarting the lock control means is not required.

Furthermore, according to the second aspect of the present invention, only the ID code obtaining means is driven intermittently in the normal mode for short standby time of the lock control means. Both the ID code obtaining means and the ID code verifying means are driven intermittently in the long leaving mode for long standby time of the lock control means. It is therefore possible to save power more effectively in the long leaving mode for long standby time, which particularly necessitates a saving of power.

In addition, according to the third aspect of the present invention, the starting code is transmitted immediately after the control button of the remote control transmitter is pressed. When the control button remains pressed after the transmission of the starting code is completed and the lock control means is started, the ID code is transmitted and then the actuator is activated to thereby de-actuate the steering lock device of the vehicle. Therefore, since the ID code is not transmitted when the control button is pressed only momentarily, there is no fear of erroneously activating the actuator. In addition, since the starting code is transmitted immediately after the pressing of the control button, response time between the pressing of the control button and the activation of the actuator can be reduced as compared with a conventional example that transmits the starting code after the control button is pressed and then released The invention being thus described, it will be obvious that the same may be varied in many ways. Such variation are not to be regarded as a departure from the spirit and scope of the invention, and all such modifications as would be obvious to one skilled in the art are intended in the following claims.

What is claimed is:

1. A vehicular remote control lock apparatus for saving power by intermittently supplying a standby current to a lock control means while a steering lock device is actuated, comprising:

an actuator for actuating and de-actuating the steering lock device of the vehicle; and a lock control means for controlling said actuator by means of a remote control transmitter, wherein a plurality of modes having different intermittent supply ratios of the standby current are selectable, and a mode for shorter standby time of the lock control means has a higher intermittent supply ratio while a mode for longer standby time of the lock control means has a lower intermittent supply ratio.

2. The vehicular remote control lock apparatus as claimed in claim 1, wherein said lock control means comprises:

an ID code obtaining means for receiving an ID code transmitted from the remote control transmitter; and an ID code verifying means for comparing the obtained ID code with a prestored ID code, wherein in a normal mode for short standby time of said lock control means, the ID code obtaining means is driven intermittently and the ID code verifying means is driven continuously, whereas in a long leaving mode for long standby time of the lock control means, both the ID code obtaining means and the ID code verifying means are driven intermittently.

3. The vehicular remote control lock apparatus as claimed in claim 2, wherein said lock control means further comprises an intermittent driving circuit, a power supply circuit, a power supply switching circuit, a main relay driving means, an actuator driving means, and an indicator output means.

4. The vehicular remote control lock apparatus as claimed in claim 3, wherein the main relay driving means is connected to a main relay for connecting a vehicle-mounted battery to various electrical equipment loads.

5. The vehicular remote control lock apparatus as claimed in claim 4, wherein said actuator driving means is connected to said actuator of the steering lock device, said steering lock device for locking a handlebars of the vehicle to disable the handlebars from rotational movement.

6. A vehicular remote control lock apparatus for saving power by intermittently supplying a standby current to a lock control means while a steering lock device is actuated, comprising:

an actuator for actuating and de-actuating the steering lock device of the vehicle;

a remote control transmitter, said remote control transmitter being capable of transmitting a starting code and an ID code by operation of a control button thereof; and a lock control means for controlling said actuator by means of said remote control transmitter, wherein the remote control transmitter transmits the starting code immediately after the control button is pressed, and when the control button remains pressed after the transmission of the starting code is completed, the remote control transmitter transmits the ID code.

7. A method of controlling a vehicular remote control lock apparatus for saving power by intermittently supplying a standby current to a lock control means while a steering lock device is actuated, said method comprising the steps of:

providing an actuator for actuating and de-actuating the steering lock device of the vehicle;

providing a lock control means for controlling said actuator by means of a remote control transmitter; and selecting a plurality of modes having different intermittent supply ratios of the standby current, wherein a mode for shorter standby time of the lock control means has a higher intermittent supply ratio while a mode for longer standby time of the lock control means has a lower intermittent supply ratio.

8. The method of controlling the vehicular remote control lock apparatus as claimed in claim 7, wherein said lock control means comprises an ID code obtaining means for receiving an ID code transmitted from the remote control transmitter and an ID code verifying means for comparing the obtained ID code with a prestored ID code, said method further comprising the steps of:

intermittently driving the ID code obtaining means and continuously driving the ID code verifying means in a normal mode for short standby time of said lock control means; and intermittently driving both the ID code obtaining means and the ID code verifying means in a long leaving mode for long standby time of the lock control means.

9. A method of controlling a vehicular remote control lock apparatus for saving power by intermittently supplying a standby current to a lock control means while a steering lock device is actuated, said method comprising the steps of:

providing an actuator for actuating and de-actuating the steering lock device of the vehicle;

providing a remote control transmitter, said remote control transmitter being capable of transmitting a starting code and an ID code by operation of a control button thereof; and providing a lock control means for controlling said actuator by means of said remote control transmitter;

transmitting the starting code immediately after the control button is pressed with the remote control transmitter; and transmitting the ID code with the remote control transmitter when the control button remains pressed after the transmission of the starting code is completed.

* * * * *